INVENTOR.
BERNHARD WEINGARTNER
BY Karl G. Ross
AGENT.

Bernhard Weingartner
INVENTOR.

United States Patent Office 3,218,579
Patented Nov. 16, 1965

3,218,579
HIGH-FREQUENCY CIRCUIT FOR CAPACITIVE-ELONGATION TRANSDUCER
Bernhard Weingartner, Vienna, Austria, assignor to Akustische u. Kino-Geräte Gesellschaft m.b.H., Vienna, Austria, a firm
Filed Apr. 12, 1962, Ser. No. 187,121
Claims priority, application Austria, Apr. 17, 1961, A 3,018/61
13 Claims. (Cl. 332—47)

This invention relates to a circuit for electroacoustic transducers based on the electrostatic principle, particularly to condenser microphones.

The known circuits belong to either of two groups. In the circuits of one group, which are widely used, the capacitive element of the transducer has a predetermined, constant electric charge applied to it and variations in capacitance caused by the diaphragm movements result in changes in voltage at a load resistor in proportion to the movement of the diaphragm. These circuits are referred to as low-frequency circuits.

The difficulties of this group of circuits reside in that very high resistances must be employed owing to the small capacitance of the microphone. This gives rise to insulation problems and requires a suppression of all those unpleasant effects which are due to the high resistance of the control circuits (e.g. the grid circuits of electronic tubes).

In the other group of circuits for condenser microphones, the variation of the capacitance of the transducer which is due to the movement of the diaphragm results in an at least approximately proportional change of a variable, e.g., the amplitude, phase or frequency of an auxiliary high-frequency oscillation. For this reason, these circuits are generally referred to as high-frequency circuits.

One of the best known circuits of this kind is the Riegger circuit, in which the variations of the capacitance of the condenser microphone cause a frequency modulation of the auxiliary high-frequency oscillation, which may then be demodulated by any conventional demodulation network to obtain a low-frequency voltage corresponding to the signal of the transducer.

In another high-frequency circuit, the amplitude of the high-frequency voltage is varied in the rhythm of the variations of the capacitance of the transducer. This arrangement results in a kind of amplitude modulation, which lacks a carrier; the same must be added in phase by means of appropriate circuits.

The main disadvantage of the previously described high frequency circuits resides in that a relatively large expenditure is required and that they are highly susceptible to slow changes of the electrical characteristics or values of their circuit elements. Whereas special care, the presently available high-precision circuit elements and a refined application technique enable even high requirements to be fulfilled, transducers of the character described have not been successful in practice, except for laboratory purposes. A special disadvantage, particularly of the Riegger circuit, resides in the need for arranging the required circuit elements very close to the transducer.

Because, on the other hand, carefully designed high-frequency circuits can provide a high signal-to-noise ratio, which cannot be achieved with low-frequency circuits, the high-frequency circuits have been further developed. One of these developments has led to the disclosure of a bridge circuit, in which the capacitive element of the transducer and an inductor are connected in one branch of the bridge and the resonant frequency of this circuit is at least approximately equal to the frequency of the supply or feed voltage. The second branch of the bridge includes an identical series-resonant circuit, which has a fixed capacitance instead of the transducer. This circuit arrangement has the advantage that it provides for a greater depth of modulation and that the noise voltage due to statistical fluctuations of the frequency and of the amplitude of the high-frequency oscillator are compensated.

Another advantage of this bridge circuit resides in that the series-resonant circuits consisting of an inductance and the capacitance of the transducer have a low resistance so that they may be arranged at any desired distance from the remaining circuit elements if they are connected to them by a matched cable. It is still necessary, however, to add the carrier-frequency component of the amplitude by an appropriate circuit (auxiliary circuit).

It is an object of the invention to provide further improvements in the last-described circuit arrangement for electrostatic transducers and, more particularly condenser microphones, so that a complete, amplitude-modulated high-frequency oscillation comprising the carrier and both side bands is produced, the oscillation being demodulated by known methods, whereas further auxiliary devices or equivalent circuits for adding the carrier to the signal are not required. This results in a much simpler circuit and in the reliability in operation required for general application in practice.

More particularly, the invention is characterized in that the bridge branches connected to the feed diagonal (D, C) are series circuits of at least one inductance and two capacitances ($L, C_1, C_0$; $L'$, $C_1'$, $C_0'$) each inductance (L or $L'$) being tuned with one of the two capacitances ($C_1$ or $C_0$; $C_1'$ or $C_0'$) for series resonance at the frequency ($\Omega$) of the feed voltage ($E\Omega$), wheras the other capacitances are detuned according to the relation $$\frac{C_0'}{C_1'} \neq \frac{C_0}{C_1}$$

so that the output voltage ($\Delta U$) is an oscillation of the high-frequency feed current, which oscillation includes both side bands and has been amplitude-modulated with the signal received from the transducer ($C_0$), the degree of modulation of said oscillation being equal to $$m = \frac{\delta}{\frac{C_0'C_1}{C_0C_1'} - 1} \text{ or } m = \frac{C_1\delta}{C_0 \cdot \frac{C_1' \cdot C_0}{C_0 \cdot C_1}} - 1$$

is, wherein $$\delta = \frac{\Delta d}{d_0}$$

$\Delta d$ is the amplitude of the elongation and $d_0$ is the steady-state distance between the diaphragm and the electrode of the transducer.

The fundamentals required for understanding the invention are apparent from the following specification with reference to the accompanying drawings.

Figure 1:
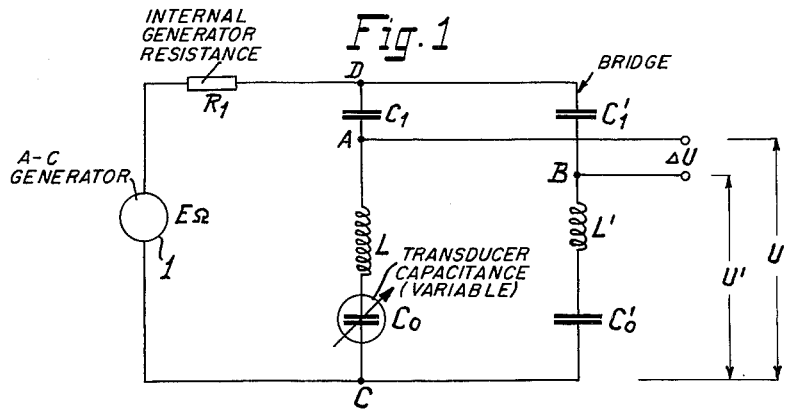
FIGS. 1 and 2 are circuit diagrams illustrating the principles of the invention.

As is apparent from FIG. 1, the bridge is fed by a generator 1 having the internal resistance $R_1$ with the high-frequency auxiliary voltage $E\Omega$ having the angular frequency $\Omega$ and applied to the diagonal CD of the bridge. One branch of the bridge includes the capacitor $C_1$, the inductor L and the transducer capacitance $C_0$. The other branch of the bridge is similar in design but the transducer capacitance is replaced by a capacitor having the capacitance $C_0'$.

Where a high-resistance load is provided or under no-load conditions the bridge voltage is the difference between the component voltages U and U' occurring between points A–C and B–C. The values of these voltages correspond to the following equations:

$$U = E\Omega \frac{j\Omega L \left(1 - \frac{1}{\Omega^2 L C_0}\right)}{R_1 + j\Omega L + \frac{1}{j\Omega C_1} + \frac{1}{j\Omega C_0}}$$

$$U' = E\Omega \frac{j\Omega L' \left(1 - \frac{1}{\Omega^2 L' C_0'}\right)}{R_1 + j\Omega L' + \frac{1}{j\Omega C_1'} + \frac{1}{j\Omega C_0'}}$$

The capacitances $C_1$ and $C_1'$ are selected so that the two bridge branches to be detuned, according to the invention as will be prescribed hereinafter, and including the inductors L and L' resonate at the frequency $\Omega$. Then:

$$\Omega = \frac{1}{\sqrt{LC_1}} = \frac{1}{\sqrt{L'C_1'}}$$

When this is introduced into the equations for U and U', it is apparent that $$U = -E\Omega \frac{1 + \Omega^2 L C_0}{1 + R_1^2 \Omega^2 C_0^2}(1 - j\Omega R_1 C_0)$$

and $$U' = -E\Omega \frac{1 + \Omega^2 L' C_0'}{1 + R_1^2 \Omega^2 C_0^2}(1 - j\Omega R_1 C_0)$$

Provided that $\Omega R_1 C_0$ and $\Omega R_1 C_0' \ll 1$, it will be seen that $$U = -E\Omega(1 + \Omega^2 L C_0)$$
$$U' = -E\Omega(1 + \Omega^2 L' C_0')$$

so that the differential bridge voltage is obtained as $$U - U' = \Delta U = E\Omega(\Omega^2 L' C_0' - \Omega L C_0)$$

It is known that the equation $$C_0 \omega = \frac{C_0}{1 + \delta \sin \omega t}$$

where $$\delta = \frac{\Delta d}{d_0}$$

$d_0$ is the steady state distance between diaphragm and electrode and $\Delta d$ is the amplitude of the elongation effected by the sinusoidal driving force having the frequency $\omega$, applies with a satisfactory accuracy to a condenser microphone having a steady-state capacitance $C_0$. In that case:

$$\Delta U = E\Omega \left(\frac{C_0'}{C_1'} - \frac{C_0}{C_1} \cdot \frac{1}{1 + \delta \sin \omega t}\right) = E\Omega \left(\frac{C_0'}{C_1'} - \frac{C_0}{C_1} + \frac{C_0}{C_1} \delta \sin \omega t\right)$$

Where $E\Omega = E \sin \Omega t$, this is the expression for an amplitude-modulated oscillation, provided that $$\frac{C_0'}{C_1'} \neq \frac{C_0}{C_1}$$

The depth of modulation equals:

$$m = \frac{\delta}{\frac{C_0' C_1}{C_0 C_1'} - 1}$$

The sensitivity may be influenced by the relation $$\frac{C_0}{C_1}$$

and by the voltage of the auxiliary source. Additional, phase-displaced carrier components developed in the resistances AC and BC are compensated by the bridge circuit.

Figure 2:
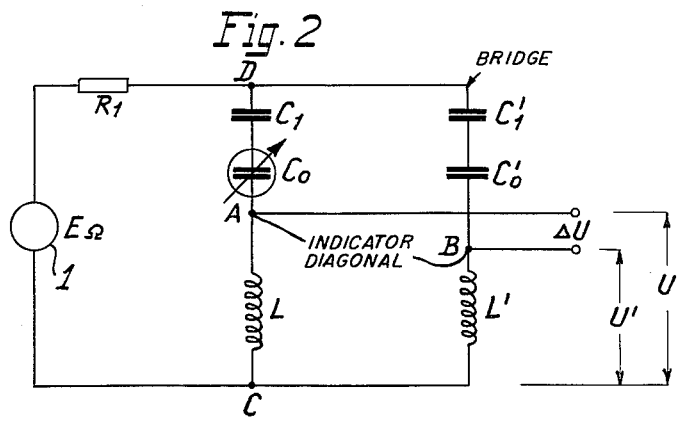

In the illustrative embodiment shown in FIG. 2, one end of each of the two inductors L and L' is connected to a common feed point of the bridge circuit whereas the bridge diagonal AB, also referred to as an indicator diagonal, is connected between the other terminals of these inductors. The useful voltage $\Delta U$ (i.e. $U - U'$) is taken from this diagonal.

When the tuning is such that $$\Omega = \frac{1}{\sqrt{LC_1}}$$

then $$\Delta U = E\Omega \left(\frac{C_0'}{C_1'} - \frac{C_0}{C_1} + \frac{C_0}{C_1} \delta \sin \omega t\right)$$

which is the same function as in the embodiment shown in FIG. 1.

It is more desirable, however, to tune so that $$\Omega = \frac{1}{\sqrt{LC_0}}$$

and to derive the useful voltage as shown in FIG. 2 between the two non-common terminals of the inductors L and L'. In this case $$\Delta U = E\Omega \left(\frac{C_1'}{C_0'} - \frac{C_1}{C_0} + \frac{C_1^2}{C_0^2} \delta \sin \omega t\right)$$

and $$m = \frac{C_1}{C_0} \cdot \frac{\delta}{\frac{C_1' C_0}{C_0' C_1} - 1}$$

This arrangement and tuning has the advantage that an increase of the ratio $$\frac{C_1}{C_0}$$

will increase the depth of modulation and the requirements for the accuracy of matching regarding the expression $$\frac{C_1'}{C_0'} \frac{C_0}{C_1}$$

are reduced.

Figure 3:
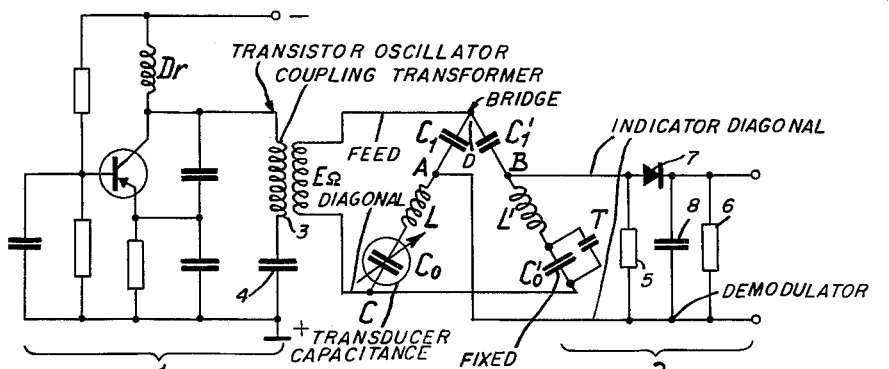
FIG. 3 is a complete practical circuit diagram embodying the invention.

In a practical embodiment as is shown in FIG. 3, the transistor oscillator 1 oscillates at a frequency of about 1.6 Mc. Its internal resistance is about 100 ohms. the output voltage E is about 10 volts.

The capsule capaciatnce $C_0$ is 105 picofarads, the capacitance $C_1 = C_1' = 10$ picofarads and $L = L' = 1$ millihenry. The capacitance $C_0'$ consists of a fixed capacitor of also 105 picofarads and a parallel-connected trimming capacitor of a few picofarads for adjusting the depth of modulation. Demodulation in the rectifier 2 will yield the low frequency. The depth of modulation is about 30% at a sound pressure of 120 phons and the sensitivity is 1 millivolt per $\mu b$.

According to another proposal according to the invention, the bridge or components thereof may form frequency-controlling elements of the oscillator which delivers the auxiliary voltage.

If the inductance L in the branch adapted to include the transducer capacitance $C_0$ is in series resonance at the frequency of the feed voltage together with the other capacitance $C_1$ in the same branch, the detuned capacitance ($C_0'$ or $C_1'$) in the other branch of said bridge may be arbitrarily adjustable to enable the relation $$\frac{C_0'}{C_1'} \neq \frac{C_0}{C_1}$$

to be fulfilled when any of various capacitive elongation transducers having different steady state capacitances are included in said circuit.

The transistor oscillator 1 illustrated in FIG. 3 is of the usual Colpitts type (see FIG. 5–0.6 of the Handbook of Selected Semiconductor Circuits NO. bsr. 73 231, Bureau of Ships, Dept. of the Navy) and is coupled via a transformer 3, in series with the tuning capacitor 4, across the feed-diagonal terminals C, D of the bridge. The primary winding of the coupling transformer 3 constitutes one of the frequency-determining impedances of the high-frequency generator constituted by the transistor oscillator. The indicator-diagonal terminals A, B are, in turn, connected to a conventional demodulator 2 consisting of a pair of load resistors 5, 6, the semiconductor diode 7 and the capacitor 8.

Figure 4:
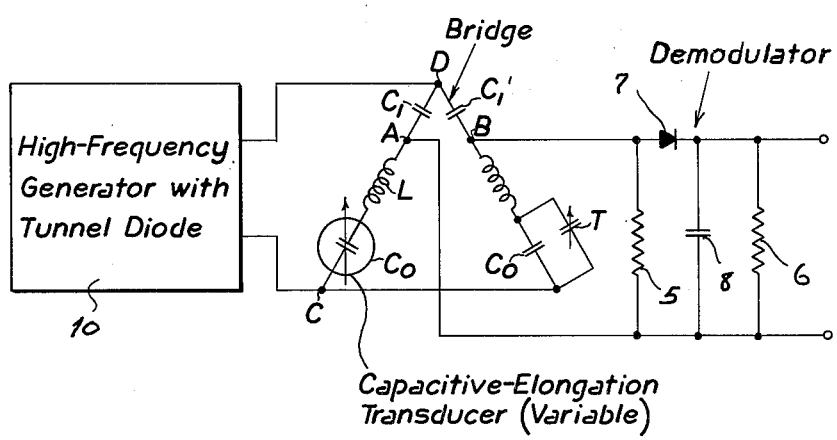
FIG. 4 is a view similar to FIG. 3 wherein the high-frequency generator is controlled by a tunnel diode.

As indicated in FIG. 4, the identical bridge-and-demodulator arrangement can be employed with a tunnel diode oscillator 10 (see, for example, Proceedings of the I.R.E., vol. 48, p. 1155, June 1960 and vol. 50, pp. 202–203, February 1962).

Figure 5:
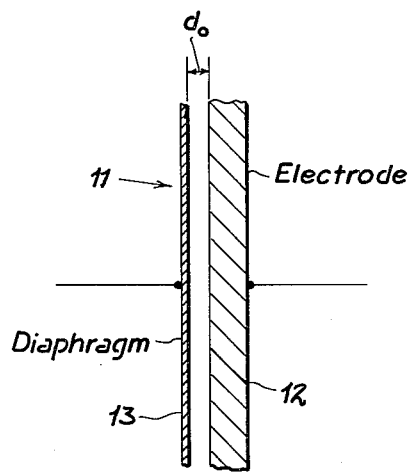
FIG. 5 is a cross-sectional view of a transducer, showing the pertinent parts thereof, useful for the purposes of the present invention.

In FIG. 5, I diagrammatically show a transducer 11 adapted to be employed with the circuits of FIGS. 1–4 at the bridge locations $c_0$. The transducer is of the capacitive-elongation type and has a diaphragm 13 spaced from an electrode 12. The distance $d_0$ is then the steady-state distance between the diaphragm and the electrode of the transducer.

What is claimed is:

1. A circuit comprising a bridge having two branches, feed-diagonal terminals connected to said branches, indicator-diagonal terminals connected to said branches, each of said branches including an inductance, one of said branches including two capacitances in series with each other and with the respective one of said inductances in said one branch, the other of said branches including a capacitance in series with the respective one of said inductances in said other branch and including a capacitive elongation transducer having a predetermined steady-state capacitance in series with said inductance and with the other capacitance in said other branch, each of said inductances and one of the capacitances connected in series therewith being at series resonance at a predetermined high frequency, the remaining two of said capacitances being detuned to fulfil the relation $$\frac{C_0'}{C_1'} \neq \frac{C_0}{C_1}$$

where $C_0$ is the value of said predetermined steady-state capacitance, $C_1$ is the value of said other capacitance in said other branch, and $C_0'$ is the value of one of said capacitances in said one branch and is connected in the same position in said one branch as said transducer is connected in said other branch, so that the application to said feed-diagonal terminals of a feed voltage at said predetermined high frequency and the simultaneous operation of said transducer thus connected will result in the development of an output voltage at said indicator-diagonal terminals, said output voltage consisting of an oscillation at said high frequency and having two side bands while being amplitude-modulated in accordance with the operation of said transducer.

2. A circuit as set forth in claim 1, in which one of said feed-diagonal terminals is connected to one end of each of said inductances and each of said indicator-diagonal terminals is connected to the other end of one of said inductances.

3. A circuit as set forth in claim 2, in which the detuned capacitances are said one capacitance in said one branch and said other capacitance in said other branch.

4. A circuit as set forth in claim 2, in which said detuned capacitances are the other capacitance in said one branch and said other capacitance in said other branch.

5. A circuit as set forth in claim 1, which comprises a high-frequency generator connected across said feed-diagonal terminals and operable to apply said feed voltage thereto.

6. A circuit as set forth in claim 5, which comprises a demodulator connected to said indicator-diagonal terminals and including at least one semiconductor diode.

7. A circuit as set forth in claim 6, in which said high-frequency generator comprises a transistor.

8. A circuit as set forth in claim 6, in which said high-frequency generator comprises a tunnel diode.

9. A circuit as set forth in claim 5, in which said high-frequency generator comprises frequency-determining impedances coupled with said bridge.

10. A circuit as set forth in claim 1, in which said inductance in said other branch and said other capacitance in said other branch are at series resonance at the frequency and said detuned capacitance in said one branch is selectively adjustable to enable said relation to be fulfilled when any of various capacitive elongation transducers having different steady-state capacitances are substituted in said circuit.

11. A circuit comprising a bridge having two branches, feed-diagonal terminals connected to said branches, indicator-diagonal terminals connected to said branches, each of said branches including an inductance and two capacitances in series therewith and with each other, one of said capacitances consisting of a capacitive elongation transducer having a predetermined steady-state capacitance and including a diaphragm and an electrode spaced from said diaphragm, each of said inductances and one of the capacitances in series therewith being in series resonance at a predetermined high frequency, the other of said capacitances being detuned to fulfill the relation $$\frac{C_0^1}{C_1} \neq \frac{C_0}{C_1}$$

where $C_0$ is the value of said predetermined steady-state capacitance, $C_1$ is the value of the other capacitance in said other branch and $C_0'$ is the value of one of said capacitances in said one branch and connected in the same position in said one branch in which said transducer is connected in said other branch, so that the application to said feed-diagonal terminals of a feed voltage at said predetermined high frequency and the simultaneous operation of said transducer will result in the development of an output voltage at said indicator-diagonal terminals, said output voltage consisting of an oscillation at said high frequency having two side bands and being amplitude-modulated in accordance with the operation of said transducer.

12. A circuit as set forth in claim 11, in which said remaining capacitances are so detuned that said output voltage has a depth of modulation $$m = \frac{\delta}{\frac{C_0^1 C_1}{C_0 C_1^1} - 1}$$

where $$\delta = \frac{\Delta d}{d_0}$$

$\Delta d$ is the amplitude of the elongation of said transducer and $d_0$ is the steady-state distance between said diaphragm and electrode of said transducer.

13. A circuit as set forth in claim 11 in which said remaining capacitances are so detuned that said output voltage has a depth of modulation $$m = \frac{C_1 \delta}{C_0 \cdot \frac{C_1^1 \cdot C_0}{C_0 \cdot C_1} - 1}$$

where $$\delta = \frac{\Delta d}{d_0}$$

$\Delta d$ is the amplitude of the elongation of said transducer and $d_0$ is the steady-state distance between said diaphragm and electrode of said transducer.

References Cited by the Examiner

UNITED STATES PATENTS 2,271,519  2/1942  Wolf _____ 332—43
2,817,818  12/1957 Patton _____ 332—43 X ROY LAKE, *Primary Examiner.*
ALFRED L. BRODY, *Examiner.*